United States Patent
Chu et al.

(10) Patent No.: US 11,475,264 B2
(45) Date of Patent: Oct. 18, 2022

(54) CARDS HAVING DYNAMIC REGIONS FOR SELECTIVELY LIMITING VISIBILITY OF CONTENT ON CARD SURFACES

(71) Applicant: Capital One Services, LLC, McLean, VA (US)

(72) Inventors: Jennifer Chu, San Francisco, CA (US); Alexander Golovanov, Lafayette, CA (US); Jonatan Yucra Rodriguez, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/190,448

(22) Filed: Mar. 3, 2021

(65) Prior Publication Data

US 2022/0284252 A1 Sep. 8, 2022

(51) Int. Cl.
*G06K 19/06* (2006.01)
*G06K 19/07* (2006.01)
*B42D 25/36* (2014.01)

(52) U.S. Cl.
CPC ......... *G06K 19/0723* (2013.01); *B42D 25/36* (2014.10)

(58) Field of Classification Search
CPC ............................ G06K 19/0723; B42D 25/36
USPC ....................................................... 235/492
See application file for complete search history.

(56) References Cited

U.S. PATENT DOCUMENTS

| 6,749,123 | B2 | 6/2004 | Lasch et al. |
| 7,823,792 | B2 | 11/2010 | Bi et al. |
| 10,713,649 | B1* | 7/2020 | Rule ................... G06Q 20/3278 |
| 2005/0051633 | A1 | 3/2005 | Lasch et al. |
| 2006/0242698 | A1* | 10/2006 | Inskeep .............. G06Q 20/4014 726/20 |
| 2008/0223937 | A1* | 9/2008 | Preta ....................... G06F 21/83 235/492 |

(Continued)

FOREIGN PATENT DOCUMENTS

| EP | 1594110 A1 | 11/2005 |
| EP | 1895451 A1 | 3/2008 |
| WO | 2004044825 A1 | 5/2004 |

OTHER PUBLICATIONS

International Search Report and Written Opinion in related PCT Application No. PCT/US2022/016296, dated Mar. 25, 2022.

*Primary Examiner* — Ahshik Kim
(74) *Attorney, Agent, or Firm* — Troutman Pepper Hamilton Sanders LLP; Christopher J. Forstner; John A. Morrissett (57) ABSTRACT

A physical card has a body with dynamic region(s) configured to appear opaque for human viewing in a first phase and translucent for human viewing in a second phase. The card also has a computer readable chip, a power supply configured to power the one or more dynamic regions, a communication device, one or more processors, and memory storing instructions that, when executed, are configured to cause the card to perform a method. The card may receive an authorization signal from a recognized user device associated with a cardholder, direct dynamic region(s) to transition from being opaque in the first phase to being translucent in the second phase, and direct the dynamic region(s) to transition from being translucent in the second phase to being opaque in the first phase upon hitting a predetermined time threshold in the second phase.

23 Claims, 5 Drawing Sheets

(56) References Cited

U.S. PATENT DOCUMENTS

| | | | |
|---|---|---|---|
| 2009/0199004 A1* | 8/2009 | Krawczewicz | G06K 19/0718 713/172 |
| 2009/0277968 A1* | 11/2009 | Walker | G07F 7/08 235/487 |
| 2019/0354986 A1* | 11/2019 | Brimhall | G06Q 20/4018 |
| 2019/0392436 A1* | 12/2019 | Lee | G06K 19/0705 |
| 2021/0174363 A1* | 6/2021 | Locke | G06K 19/07773 |

* cited by examiner

CARDS HAVING DYNAMIC REGIONS FOR SELECTIVELY LIMITING VISIBILITY OF CONTENT ON CARD SURFACES

FIELD

The disclosed technology generally relates to transaction cards, identification cards, and other physical cards, and, more particularly, to cards and supporting systems and methods that selectively limit visibility of surface regions on the cards for improved security and discretion of content in those regions.

BACKGROUND

Physical cards such as transaction cards, identification cards, and the like often contain sensitive information (e.g., cardholder name and personal information, card number, expiration date, card verification value, etc.) that is sometimes needed to complete a transaction or interaction with law enforcement, government agencies, and/or merchants. Traditional cards statically display this sensitive information on the front or back surfaces of the card for viewing by a person in possession of the card. While this allows an authorized person in possession of the card (e.g., a restaurant server collecting a transaction card, a merchant selling alcoholic beverages to the cardholder, etc.) to view the necessary information, as is desired by the cardholder, it also risks exposure of the sensitive information to bystanders proximate the authorized person and/or unauthorized persons who obtain possession of the card who may be identity thieves or scammers.

Accordingly, there is a need for physical cards and supporting systems and methods that selectively limit the visibility of sensitive information on the cards for improved security. The disclosed cards, systems, and methods are directed to these and other considerations.

BRIEF SUMMARY

The disclosed technology includes systems and methods for selectively limiting the visibility of sensitive information on physical cards for improved security and discretion of that information. In certain example implementations, the disclosed technology includes a physical card (e.g., a transaction card, identification card, etc.) having a substantially planar body that is bounded by a continuous peripheral edge. The body may include one or more dynamic opacity regions having a material configured to appear opaque for human viewing in a first phase and translucent for human viewing in a second phase. The card may also have a computer readable chip, a power supply (e.g., a battery or other power source or a receiver configured to receive power from an external power source) configured to power the one or more dynamic opacity regions, a communication device, one or more processors, and memory in communication with the processors and storing instructions that, when executed, are configured to cause the card to perform a method. The card may receive, via the communication device, an authorization signal from a recognized user device within a predetermined range of the physical card. The recognized user device may be associated with a cardholder of the card or an authorized user depending on how the cardholder's related account is set up. The card may direct, via the one or more processors, at least one of the one or more dynamic opacity regions to transition from being opaque in the first phase to being translucent in the second phase responsive to receiving the authorization signal. Then, the card may direct, via the one or more processors, the at least one of the one or more dynamic opacity regions to transition from being translucent in the second phase to being opaque in the first phase upon hitting a predetermined time threshold in the second phase.

In some embodiments, the one or more dynamic opacity regions each contain first type information (e.g., sensitive information), with the first type information being concealed from human viewing when the material is in the first phase and human viewable when the material is in the second phase. The first type information may be associated with the physical card (e.g., a transaction card) and include a card number (e.g., a credit or debit card number), name, expiration date, and a card identifier, and is distinguishable from second type information (e.g., non-sensitive information) like the financial service provider who issued the card or a company logo or other aesthetic design on the card that does not identify the cardholder or related account information. Alternatively, when the physical card is an identification card, the first type information may include a card number, name, photograph, other personal information (e.g., address, sex, age, height, weight, etc.), expiration date, and a card identifier. In either embodiment, the first type information may also include authentication information that can be used to identify the cardholder (e.g., fingerprints), while the second type information may include information that the cardholder wants third parties to be able to view anytime such as information to authenticate the card or prevent unauthenticated duplication thereof (e.g., holographic symbols), medical emergency information (e.g., organ donor status, blood type, etc.), non-confidential card identifiers (e.g., an arbitrary number, letter, or symbol) and the like.

In some embodiments, the material extends to all the first type information in the one or more dynamic opacity regions. In other embodiments, the material extends to only a portion of the first type information in the one or more dynamic opacity regions.

Further, the instructions, when executed by the one or more processors, may be further configured to cause the card to selectively authenticate the authorization signal based at least in part on information contained in the authorization signal, and direct the at least one of the one or more dynamic opacity regions to transition from being opaque in the first phase to being translucent in the second phase is responsive to authenticating the authorization signal. Selectively authenticating the authorization signal may include comparing the information contained in the authorization signal with trusted device information stored locally in the memory.

The instructions, when executed by the one or more processors, may be further configured to cause the physical card to categorize the authorization signal into one of a plurality of authorization categories comprising a full authorization signal and a limited authorization signal. In such embodiments, directing the at least one of the one or more dynamic opacity regions to transition from being opaque in the first phase to being translucent in the second phase may include directing all of the one or more dynamic opacity regions to transition from being opaque in the first phase to being translucent in the second phase responsive to categorizing the authorization signal as the fully authorization signal and directing only a first portion of the one or more dynamic opacity regions (e.g., those covering the last four digits of a credit card number) to transition from being opaque in the first phase to being translucent in the second phase responsive to categorizing the authorization signal as the limited authorization signal.

In some embodiments, the instructions, when executed by the one or more processors, may be further configured to cause the physical card to disable the computer readable chip upon hitting the predetermined time threshold in the second phase.

In another aspect, a method for selectively revealing first type information (e.g., sensitive information) on a surface of a physical card (e.g., transaction card, identification card, etc.) is disclosed. The method may include receiving, via a communication device of the physical card, an authorization signal from a recognized user device within a predetermined range of the physical card. The recognized user device may be associated with a user of the physical card. The card may have a body including one or more dynamic opacity regions having a material configured to appear opaque for human viewing in a first phase and translucent for human viewing in a second phase. The method may also include directing, via one or more processors of the physical card, at least one of the one or more dynamic opacity regions to transition from being opaque in the first phase to being translucent in the second phase responsive to receiving the authorization signal. Further, the method may include directing, via the one or more processors, the at least one of the one or more dynamic opacity regions to transition from being translucent in the second phase to being opaque in the first phase upon exceeding a predetermined time threshold in the second phase.

The one or more dynamic opacity regions may each contain first type information (e.g., sensitive information), with the first type information being concealed from human viewing when the material is in the first phase and human viewable when the material is in the second phase.

Directing at least one of the one or more dynamic opacity regions to transition from being opaque in the first phase to being translucent in the second phase may also include identifying an authorization type associated with the authorization signal, identifying one or more selected dynamic opacity regions of the one or more dynamic opacity regions based on the authorization type, and directing only the one or more selected dynamic opacity regions to transition from being opaque in the first phase to being translucent in the second phase.

In some embodiments, the method may also include directing, via the one or more processors, a computer readable chip of the physical card to become disabled for purposes of conducting new transactions upon exceeding a predetermined time threshold in the second phase.

In yet another aspect, a physical card may include a body, one or more processors, and a memory in communication with the one or more processors. The body may include a plurality of dynamic textual characters in a material configured to appear in a first color for human viewing in a first phase and in a second color for human viewing in a second phase to selectively reveal first type information (e.g., sensitive information) represented by sequences of the dynamic textual characters. The memory may store instructions that, when executed by the one or more processors, are configured to cause the physical card to perform one or more steps of a method. For example, the card may receive an authorization signal from a trusted user device associated with an authorized user of the physical card. The card may direct at least one selected character of the plurality of dynamic textual characters to transition from appearing in a first color in the first phase to appearing in the second color in the second phase responsive to receiving the authorization signal. Further, the card may direct the at least one selected character to transition from appearing in the second color in the second phase to appearing in the first color in the first phase upon exceeding a predetermined time threshold in the second phase.

In some embodiments, the first color matches a surrounding background color of the body, and the second color differs from the first color. The card may also have a power source configured to provide power to the plurality of dynamic textual characters and/or a computer readable chip for conducting new transactions. In such embodiments, the computer readable chip may be configured to receive power from an external power source for purposes of providing power to the plurality of dynamic textual characters and the instructions, when executed by the one or more processors, may be further configured to cause the physical card to disable the computer readable chip upon exceeding the predetermined time threshold in the second phase.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Some implementations of the disclosed technology will be described more fully with reference to the accompanying drawings, which form a part hereof, and in which is shown by way of illustration various example embodiments in which aspects of the disclosure may be practiced. It is to be understood that other embodiments may be utilized, and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to cards and supporting systems, methods and techniques for selectively limiting the visibility a certain region(s) on cards. For example, some embodiments describe techniques for enabling a cardholder to selectively reveal some or all of the sensitive information contained in dynamic region(s) on the card to, e.g., allow a server at a restaurant process the card for a transaction or for a law enforcement agent to review an user's driver's license before reverting those dynamic region(s) to a state of limited visibility. For a transaction card, the techniques may involve selectively disabling the chip on the card for purposes of subsequent transactions. This may provide advantages over other techniques by improving security of the sensitive information to help prevent bystanders or authorized persons from viewing it.

Example methods and systems may include a physical card (e.g., a transaction card or an identification card) with one or more dynamic regions that selectively reveal or limit visibility of contained information to a cardholder or authorized persons that the cardholder gives permission to handle the card. For instance, the dynamic region(s) of the card may be configured to appear opaque for human viewing in a first phase and translucent for human viewing in a second phase. The card may receive an authorization signal from a recognized user device associated with a cardholder (e.g., the cardholder or an authorized user associated with the cardholder's account), and direct the dynamic region(s) to transition from being opaque in the first phase to being translucent in the second phase to reveal the sensitive information for a limited duration. This may, for example, allow a transaction to occur or for an interaction with law enforcement, government agents, and/or merchants. After such transaction or interaction, the card may direct the dynamic region(s) to transition from being translucent in the second phase to being opaque in the first phase upon hitting a predetermined time threshold in the second phase.

Figure 1:
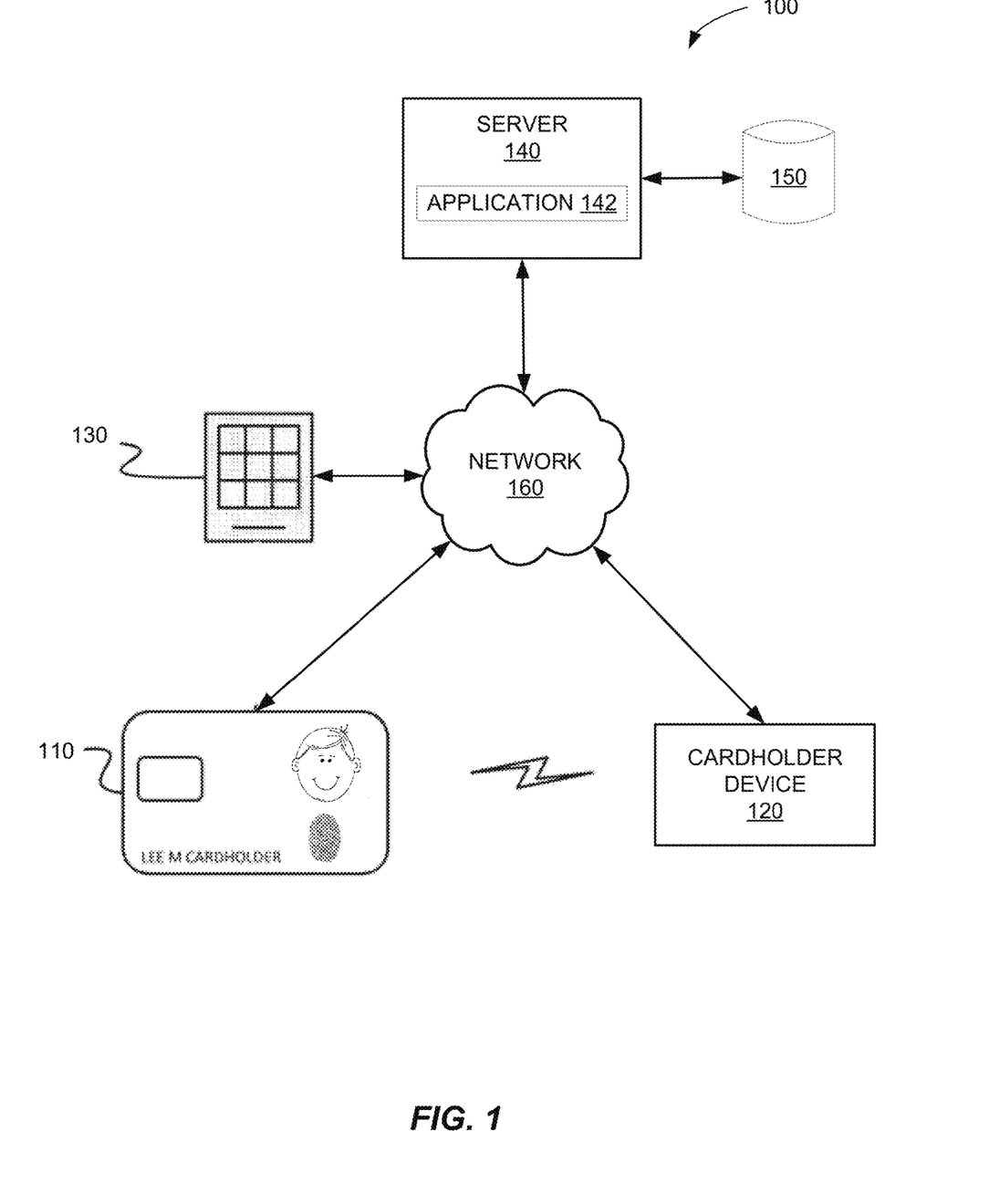
FIG. 1 shows an example of a system for selectively limiting visibility of card surface region(s), in accordance with one or more aspects described herein.

Oftentimes, there are several components at work when transacting using a transaction card, such as a debit card or a credit card. FIG. 1 shows a system 100 that illustrates several of the components that may be found when conducting a transaction with a transaction card. For example, system 100 shows a transaction card 110 communicatively coupled to a cardholder device 120, a card reader 130, a server 140, which may include a database 150, via a network 160. Additionally, transaction card 110 and cardholder device 120 may be configured to communication directly via a wireless or wired communication.

Transaction card 110 may be any suitable card configured to permit a cardholder to access funds in one or more of a cardholder's account. In this regard, transaction card 110 may be a credit card, a charge card, a debit card, a prepaid card, or the like. In some embodiments, transaction card 110 may provide access to one or more types of accounts. For instance, transaction card 110 may allow a cardholder to select from a credit card option and/or a debit card option. As will be discussed in greater detail with respect to FIG. 2, transaction card 110 may be a chip-enabled card. In some embodiments, transaction card 110 may include a magnetic strip, in addition to the chip. In further embodiments, transaction card 110 may include near field communication (NFC) capabilities, short-range wireless communication capabilities (e.g., Bluetooth®), wireless communication capabilities (e.g., Wi-Fi), or any combination thereof. The NFC capabilities, short-range wireless communication capabilities, wireless communication capabilities may be referred to collectively as communication capabilities. These communication capabilities may permit transaction card to communicate with cardholder device 120 and card reader 130. Additionally, transaction card 110 may include one or more dynamic regions to selectively reveal or limit visibility of information contained therein, as will be discussed in greater detail below.

While transaction card 110 is described as a transaction card (e.g., credit card, debit card, etc.) for exemplary purposes, it may include other physical cards such as identification cards (e.g., government issued identification like a driver's license), membership or rewards cards, hotel room key or other "access" cards, and the like. While the information contained on those cards may differ from that of a transaction card, the disclosed methods and techniques would be function similarly.

Cardholder device 120 may be a cellular phone, a mobile phone, a smart phone, a tablet, a laptop. Cardholder device 120 may be configured to provide a first cardholder with access to various applications and services. For example, cardholder device 120 may provide the first cardholder with access to the Internet. Additionally, cardholder device 120 may provide the first cardholder with one or more applications located thereon. The one or more applications may provide the first cardholder with a plurality of tools and access to a variety of services. In some embodiments, the one or more applications may include an application, such as a banking application or credit card application, that allows the first cardholder to selectively control operation of the dynamic region(s).

Card reader 130 may be any suitable card reader capable of reading data and/or information from transaction card 110. In this regard, card reader 130 may be a chip-based reader, a magnetic-based reader, an EMV reader, or any combination thereof. Accordingly, card reader 130 may include a display, a keypad, and a network interface. The display may be present information to the cardholder, such as the amount owed, the status of the transaction, and whether the transaction has been approved or denied. Keypad may allow a cardholder to input a PIN code, password, an amount for withdrawal, and the like. Network interface may be a wired connection, wireless connection, a short-range wireless connection, an NFC connection, or any combination thereof. Network interface may permit card reader 130 to communicate with server 140, via network 160, for example, to authorize a transaction. Similarly, network interface may permit card reader 130 to communicate with transaction card 110 and/or cardholder device 120. In these instances, card reader 130 may convey information related to the cardholder's account to transaction card 110 and/or cardholder device 120.

Server 140 may be any server capable of executing the banking application or other applications supported by a financial service provider and available for download on cardholder device 120. Additionally, server 140 may be communicatively coupled to database 150. In this regard, first server 140 may be a stand-alone server, a corporate server, or a server located in a server farm or cloud-computer environment. According to some examples, first server 140 may be a virtual server hosted on hardware capable of supporting a plurality of virtual servers. The banking application may be server-based software configured to provide cardholders with control over certain functions of their card (e.g., operation of the dynamic region(s) and the chip) and, optionally, also provide access to their account information and perform routing banking functions. In some embodiments, the banking application may be the server-based software that corresponds to the client-based software executing on cardholder device 120. Additionally, or alternatively, the banking application may provide cardholders with control over their card and/or access to their account information through a website accessed by cardholder device 120 via network 160.

Database 150 may be configured to store information on behalf of the banking application. Banking information may include, but is not limited to, personal information, account information, and cardholder-preferences, collectively sensitive information associated with the card and/or the cardholder's account. Personal information may include a cardholder's name, address, phone number (i.e., mobile number, home number, business number, etc.), social security number, cardholder name, password, employment information, family information, and any other information that may be used to identify the first cardholder. Account information may include account balances, bill pay information, direct deposit information, wire transfer information, statements, and the like. Cardholder-preferences may define one or more spending thresholds, how cardholders receive notifications and alerts, spending notifications, and the like. Database 150 may include, but is not limited to, relational databases, hierarchical databases, distributed databases, in-memory databases, flat file databases, XML databases, NoSQL databases, graph databases, and/or a combination thereof.

Network 160 may include any type of network. In this regard, first network 160 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and cardholders to support input, extraction, and manipulation of data between the various computing devices in the system 100. Web services built to support a personalized display system may be cross-domain and/or cross-platform and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
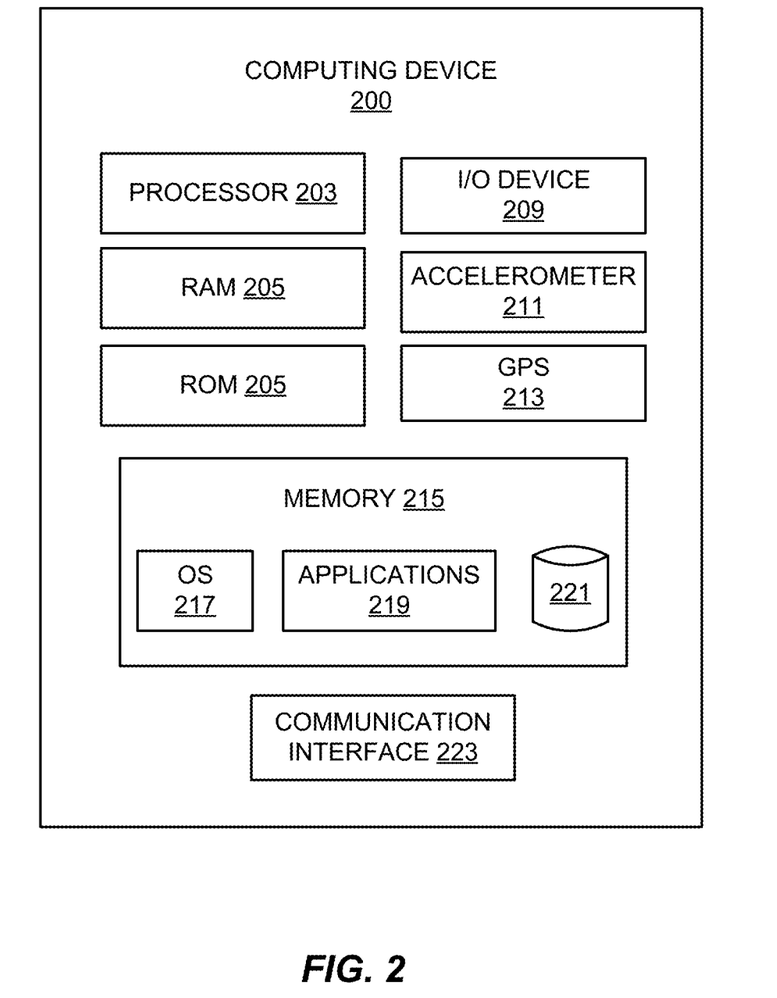
FIG. 2 shows an example of a cardholder computing device, in accordance with one or more aspects of the disclosure.

Some example embodiments described herein may be implemented, in whole or in part, using one or more computing systems described with respect to FIG. 2. FIG. 2 describes a computing device 200 that may be used with one or more of the computational systems, such as a terminal (e.g., card reader, register, etc.), though other computational systems described herein, including cardholder device 120, may share one or more features of computing device 200. The computing device 200 may include processor(s) 203 for controlling overall operation of the computing device 200 and its associated components, including RAM 205, ROM 207, an input/output device 209, an accelerometer 211, a global positioning system (GPS) antenna 213, memory 215, and/or a communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, electronic terminals, transactional terminals, and the like, and/or any other type of data processing device.

Input/output (I/O) device 209 may include a microphone, keypad, touch screen, and/or stylus through which a cardholder of the computing device 200 may provide input, and may also include one or more of a speaker for providing audio output and a video display device for providing textual, audiovisual, and/or graphical output. In some embodiments, I/O device 209 may include an image capture device.

Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first cardholder. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein. Communication interface 223 may also include near field communication (NFC) capabilities, short-range wireless communication capabilities (e.g., Bluetooth®), wireless communication capabilities (e.g., Wi-Fi), or any combination thereof.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication.

An example embodiment of a transaction card may include dynamic region(s) for selectively limiting (or in turn increasing) visibility of information contained thereon, including sensitive information. As discussed above, concealing or otherwise limiting visibility of sensitive information on a card may help prevent scammers and fraudsters from undesirably obtaining and using that information (e.g., for identify theft and/or attempting fraudulent transactions). The following discussion describes several techniques for selectively limiting the visibility of dynamic region(s) of a transaction card (e.g., card 100) or other physical card.

Figure 3A:
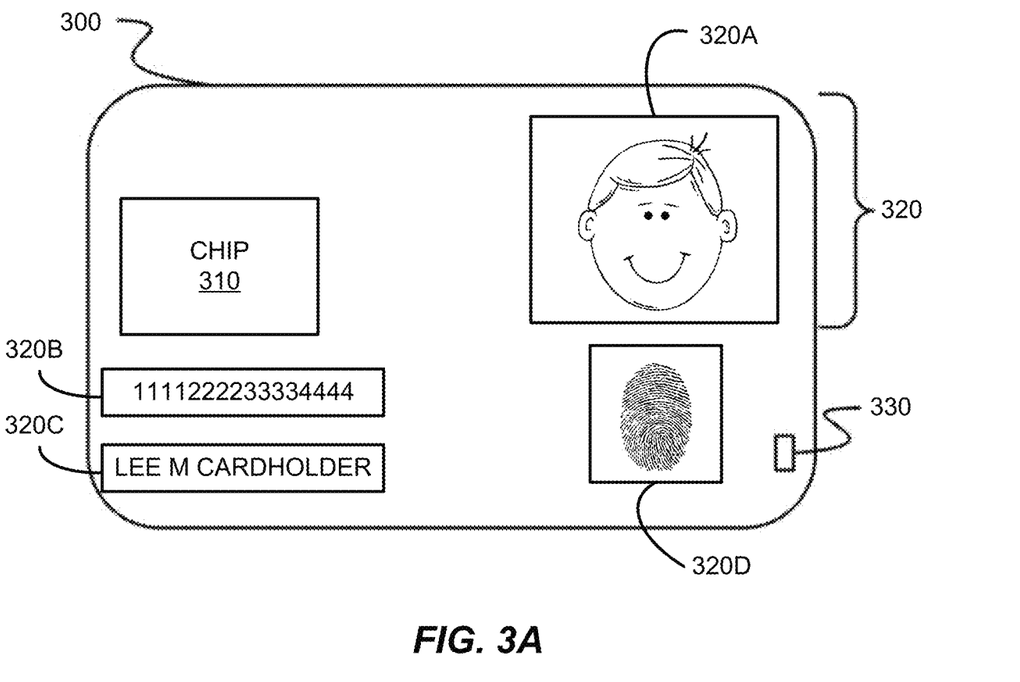
FIGS. 3A-D show an example of a transaction card configured to selectively limit visibility of dynamic region(s) on the card surface, in accordance with one or more aspects of the disclosure.

FIGS. 3A-D illustrate a transaction card 300, which may be one example of card 100 in system 100, according to one example embodiment of the disclosure. Transaction card 300 may be of a standard size (or a non-standard size) and made of a substrate, such as plastic, metal, etc. FIG. 3A illustrates a front surface of transaction card 300 with visibility of the dynamic region(s) not limited such that any person facing the front surface of transaction card 300 could read information contained thereon. As shown, the front surface of transaction card 300 may include a chip 310, one or more dynamic region(s) 320A, B, C, D (collectively dynamic regions 320), and a charging port 330.

Chip 310 may be a smart chip or an integrated circuit. In this regard, chip 310 may include a microprocessor and memory, such as read only memory (ROM) and random-access memory (RAM). Additionally, chip 310 may include one or more contact pads to receive voltage to power the transaction card and exchange signals with a terminal, such as cardholder device 120 and/or card reader 130. In some embodiments, chip 310 may be configured to execute one or more applications. The applications may allow chip 310 to process payments, for example, using a payment application. For example, chip 310 may verify a cardholder via a method supported by the terminal and agreed upon by chip 310. Additionally, chip 310 may confirm the transaction, for example, by verifying the cardholder, determining any processing restrictions, authenticating offline data associated with the cardholder, or any combination thereof. In some instances, the terminal may determine that the transaction is required to be processed online processing. In these instances, chip 310 may generate a request authorization that is transmitted to the issuer, via the terminal. In other examples, one or more applications may allow chip 310 to determine whether a current transaction is a duplicate of an earlier transaction. In further examples, one or more applications may allow chip 310 to perform cryptographic processing, authenticate transaction card 300, define risk management parameters (e.g., when the transaction may be conducted offline), digitally sign payment data, and verify the cardholder. Additionally, or alternatively, chip 310 may be a dual interface chip that provides for contact and contact-less interfaces.

Dynamic regions 320 may comprise one or more materials configured to selectively change visual properties, including smart glass (sometimes referred to as switchable glass), and these materials may form the entirety or only a portion of (e.g., only proximate the last four digits of a credit card number or only on front surfaces of embossed text rather than a background around the text) a particular dynamic region. Smart glass is a glass or glazing whose light transmission properties are altered when voltage, light, and/or heat is applied. Smart glass changes from transparent to translucent and vice versa, changing from letting light pass through to blocking some or all wavelengths of light and vice versa. Smart glass technologies include, for example, electrochromic, photochromic, thermochromic, suspended-particle, micro-blind, and polymer-dispersed liquid-crystal devices.

Electrochromic devices change light transmission properties in response to voltage and thus allow control over the amount of light and heat passing through. In electrochromic windows, for example, the electrochromic material changes its opacity. A burst of electricity is required for changing its opacity, but once the change has been affected, no electricity is needed for maintaining the shade which has been reached. Electrochromic devices may also involve reflective hydrides, which become reflective rather than absorbing, and thus switch states between transparent and mirror-like. Modified porous nano-crystalline films may also be stacked on top of one another on a substrate modified with a transparent conductor to form an electrochromic display. In practice, an electrochromic display can be switched on by applying an electrical potential to the transparent conducting substrate relative to a conductive carbon layer. This causes a reduction of viologen molecules (coloration) to occur inside the working electrode. By reversing the applied potential or providing a discharge path, the display bleaches. Advantageously, a relatively low voltage (around 1 volt) is needed to color or bleach the viologens.

Alternatively, in suspended-particle devices (SPDs), a thin film laminate of rod-like nano-scale particles is suspended in a liquid and placed between two pieces of glass or plastic, or attached to one layer. When no voltage is applied, the suspended particles are randomly organized, thus blocking and absorbing light. When voltage is applied, the suspended particles align and let light pass. Varying the voltage of the film varies the orientation of the suspended particles, thereby regulating the tint of the glazing and the amount of light transmitted. SPDs can be manually or automatically "tuned" to precisely control the amount of light, glare and heat passing through.

In polymer-dispersed liquid-crystal devices (PDLCs), liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the "smart window". Typically, the liquid mix of polymer and liquid crystals is placed between two layers of glass or plastic that include a thin layer of a transparent, conductive material followed by curing of the polymer, thereby forming the basic sandwich structure of the smart window. This structure is in effect a capacitor. Electrodes from a power supply are attached to the transparent electrodes. With no applied voltage, the liquid crystals are randomly arranged in the droplets, resulting in scattering of light as it passes through the smart window assembly. This results in the translucent, "milky white" appearance. When a voltage is applied to the electrodes, the electric field formed between the two transparent electrodes on the glass causes the liquid crystals to align, allowing light to pass through the droplets with very little scattering and resulting in a transparent state. The degree of transparency can be controlled by the applied voltage. This is possible because at lower voltages, only a few of the liquid crystals align completely in the electric field, so only a small portion of the light passes through while most of the light is scattered. As the voltage is increased, fewer liquid crystals remain out of alignment, resulting in less light being scattered. It is also possible to control the amount of light and heat passing through, when tints and special inner layers are used.

Micro-blinds control the amount of light passing through in response to applied voltage. The micro-blinds are composed of rolled thin metal blinds on glass. They are very small and thus practically invisible to the eye. The metal layer is deposited by magnetron sputtering and patterned by laser or lithography process. The glass substrate includes a thin layer of a transparent conducting oxide (TCO) layer. A thin insulator is deposited between the rolled metal layer and the TCO layer for electrical disconnection. With no applied voltage, the micro-blinds are rolled and let light pass through. When there is a potential difference between the rolled metal layer and the transparent conductive layer, the electric field formed between the two electrodes causes the rolled micro-blinds to stretch out and thus block light. The micro-blinds have several advantages including switching speed (milliseconds), UV durability, customized appearance and transmission.

Regardless of which type of smart glass technology is used or even if an alternative material with visual property changing properties is used, that material may form an outermost layer of dynamic region(s) 320. Alternatively, in some embodiments, a clear layer or coating may cover that material to help improve its durability without affecting its dynamic visual properties. In operation, dynamic region(s) 320 may be capable of switching between being entirely transparent to the human eye to entirely opaque to the human eye, and/or generating a plurality of colors (e.g., to blend in with a background color of the card). Dynamic region(s) 320 may be configured to adjust transparency level (e.g., to adjust based on different lighting environments) and/or color responsive to authorization signal(s) from cardholder device 120, and some dynamic regions (e.g., dynamic region 320A) may be configured to adjust transparency level and/or color of portions thereof and/or independent of other dynamic regions (e.g., dynamic region 320B). For example, a portion of material used in dynamic region 320B may cover all but the last four digits of a card number such that the entire card number can be visible to the human eye in FIG. 3A, then only the last four digits are visible in FIG. 3C, then none of the card number is visible in FIG. 3D. Independently, dynamic region 320A, C, and D may allow the human eye to view a picture of the cardholder (e.g., FIG. 3A), portions or the entirety of the cardholder's name in (e.g., FIGS. 3A, 3C), and a fingerprint (e.g., FIGS. 3A, 3C). In some embodiments, some or all dynamic region(s) 320 may continuously extend over a plurality of characters (e.g., an entire card number) as a unit. In other embodiments, some or all dynamic region(s) 320 may extend over individual characters (e.g., a single digit of a card number).

Charging port 330 may be configured to receive a cable to supply power to recharge power supply 350 (discussed in greater detail below). In this regard, charging port 330 may be mounted to a surface of transaction card 300. In alternative embodiments, charging port 330 may be mounted to an edge of transaction card 300. In some embodiments, charging port 330 may include one or more solar cells configured to provide power to power supply 350. As will be discussed in greater detail below, power supply 350 may include an inductive coil to recharge the power supply via electromagnetic induction, obviating the need for charging port 330.

Figure 3B:
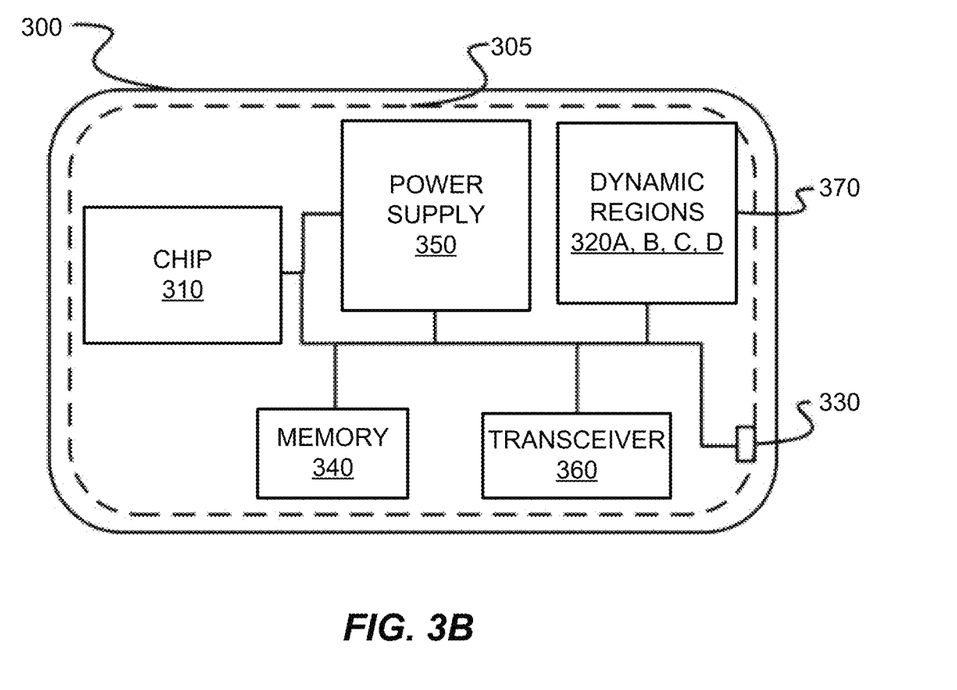
Figure 3C:
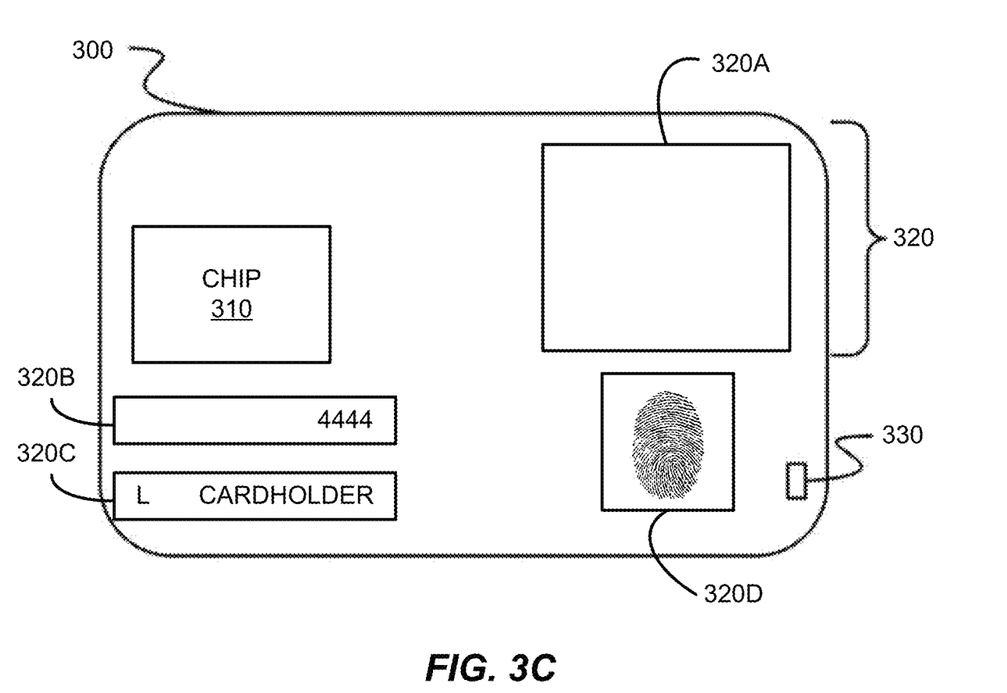

Turning to FIG. 3B, an example of the hardware of transaction card 300 is shown. In this regard, transaction card 300 may include a flexible circuit board 305 on which chip 310, charging port 330, memory 340, battery 350, transceiver 360, and dynamic region array 370 may be mounted. Flexible circuit board 305 may be sandwiched between two substrate layers that are adjoined along the edges of the substrate layers. As noted above, the substrate layers may be made of plastic, metal, or any equivalent thereof used in the manufacture of transaction cards. Flexible circuit board 305 may be made a flexible plastic substrate, such as polyimide, polyether ether ketone (PEEK), or any transparent conductive polymer. In some instances, flexible circuit board may be screen printed circuits on polyester.

As noted above, several circuits and/or components, including chip 310, charging port 330, memory 340, battery 350, transceiver 360, and dynamic region array 370, may be mounted on flexible circuit board 305. Chip 310, indicator LEDs 320, and charging port 330 may be mounted on flexible circuit board 305 and accessible via one of the substrate layers encasing flexible circuit board 305. Accordingly, chip 310, indicator LEDs 320, and charging port 330 were described in greater detail above with respect to FIG. 3A.

Memory 340 may be any type of media capable of storing data and information accessible by chip 310. Accordingly, memory 340 may include a hard-drive, a solid-state drive, memory card, flash drive, ROM, RAM, or other optical disks, as well as other write-capable and read-only memories. Memory 340 may include short term or temporary storage as well as long term or persistent storage. In some embodiments, memory 340 may be integral to chip 310. Alternatively, memory 340 may be a circuit that is separate from chip 310. In some embodiments, memory 340 may store a table that indexes information related to a plurality of recent transactions. The plurality of recent transactions may include a predetermined number (e.g., 10, 50, 100) of transactions. Alternatively, the plurality of recent transactions may be time-based. In this regard, the memory may store recent transactions for a predetermined time period, such as the last day, last week, last month, last six months, etc. The table may index a plurality of information for each transaction. The plurality of information may include a transaction identifier, a merchant name, an amount, an authorization code, a date of the transaction, and/or a time of the transaction. In some instances, the table may also include a hash value for each transaction. The hash value may be generated by hashing one or more of the transaction identifiers, the merchant name, the amount, the authorization code, the date of the transaction, and the time of the transaction. The table, and the information stored therein, may allow chip 310 to determine whether a current transaction is a duplicate of an earlier transaction.

Power supply 350 may be any suitable power source capable of providing power to transaction card 300. Power supply 350 may be a battery mounted on, or in, transaction card 300. Accordingly, power supply 350 may be a small, thin battery capable of being mounted on flexible circuit board 305 between two substrate layers. In this regard, power supply 350 may be a rechargeable battery, such as a lithium-ion (Li-ion), lithium-ion polymer (Li-ion polymer), nickel-cadmium (NiCd), nickel-metal hydride (NiMH), or any equivalent thereof. In other instances, power supply 350 may be disposable battery capable of being replaced. In some embodiments, power supply 350 may include an inductive coil that allows power supply 350 to be recharged via electromagnetic induction. In further embodiments, power supply 350 may be one or more solar cells.

Transceiver 360 may be configured to exchange signals with a terminal, such as cardholder device 120 and/or card reader 130, on behalf of transaction card 300. Transceiver 360 may include an antenna or other communication capabilities, such as near field communication (NFC), Wi-Fi, Bluetooth®, or any equivalent thereof. Transceiver 360 may be configured to permit transaction card 300 to communicate with card reader 130 and/or cardholder device 120. In other embodiments, transceiver 360 may comprise a short-range wireless transceiver configured to exchange signals with card reader 130 and/or cardholder device 120.

Dynamic region array 370 may be a circuit on which dynamic region(s) 320 are mounted. In this regard, LED array 370 may include a driver, or an equivalent circuit, light source, or heat source, that is capable of illuminating indicator dynamic regions 320 in the manner described above. Additionally, dynamic region array 370 may include one or more resistors (not shown). Alternatively, or additionally, dynamic region array 370 may include one or more circuits to improve the energy efficiency of dynamic region array 370. In operation, dynamic region array 370 may be communicatively coupled to chip 310. In response to one or more signals received from chip 310, dynamic region array 310 may cause dynamic region(s) 320 to alter the light transmission properties and/or other visible properties of their respective materials, which may change dynamic region(s) 320 from being transparent to translucent and vice versa, changing from letting light pass through to blocking some or all wavelengths of light and vice versa. As will be discussed in greater detail below, the one or more signals may be transmitted to transaction card 300 from a computing device associated with the cardholder (e.g., cardholder device 120) and/or a financial service provider (e.g., via server 140) and routed, via chip 310, to dynamic region array 370 to selectively adjust one or more dynamic regions 320.

Figure 4:
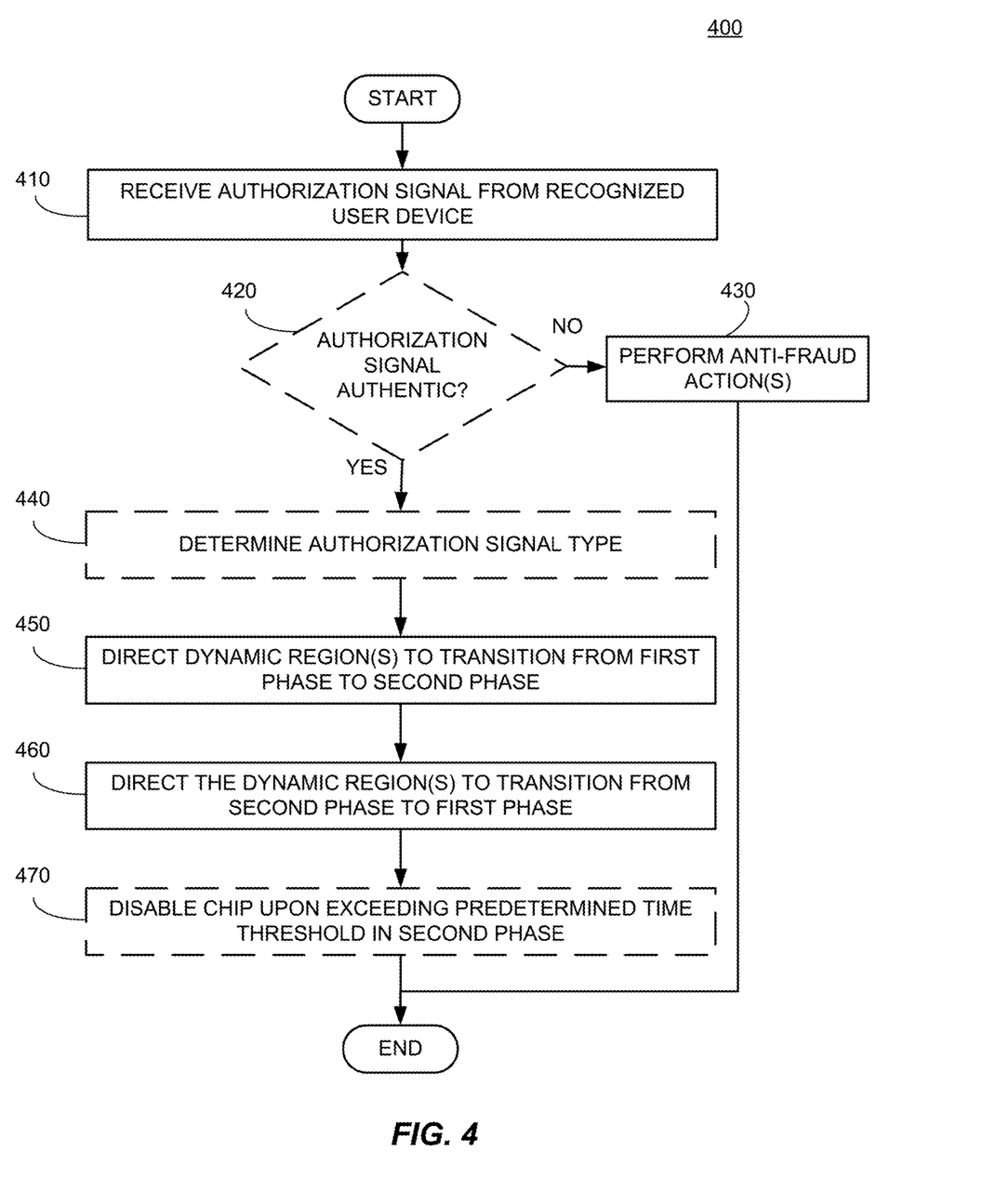
FIG. 4 shows a flow chart of an example process for selectively limiting visibility of card surface region(s) according to one or more aspects of the disclosure.

As noted above, a transaction card (e.g., card 100 and/or transaction card 300) may be configured to selectively limit visibility of dynamic region(s) to conceal or reveal sensitive information contained thereon. FIG. 5 shows a flow chart of an example process 500 for selectively limiting visibility of dynamic region(s) of a card, according to one or more aspects of the disclosure. Some or all the steps of process 500 may be performed using one or more of the transaction cards described herein. Additionally, some of the steps of process 500 may be performed using one or more of the computing devices described herein in conjunction with one or more of the transaction cards or other physical cards disclosed herein.

In block 410, transaction card 110 may receive an authorization signal from a recognized user device (e.g., cardholder device 120). The authorization signal may be triggered through the banking application supported by server 140 and may indicate a desired level of revealing sensitive information for the cardholder. For example, the authorization signal may indicate based on cardholder input via cardholder device 120 that the cardholder desires to entirely or only partially reveal certain sensitive information. Alternatively, the authorization signal may include other environmental data, such as connected networks and/or devices or GPS location associated with cardholder device 120 and use that environmental data to indicate that certain sensitive information should be revealed. For example, if the GPS location and/or connected wireless network associated with cardholder device 120 when providing authorization signal indicates that the cardholder is at his residence instead of in a coffee shop, that environmental data may be included as part of the authorization signal to determine that all sensitive information should be revealed instead of only some. In some embodiments, the environmental data may also be used to adjust a transparency or opaqueness level of one or more dynamic region(s) 320 to optimal or preset setting based on lighting in the surrounding environment. Regardless of the type of authorization signal and contents thereof, before receiving this authorization signal, transaction card 110 may be configured to entirely conceal sensitive information in one or more of dynamic regions 320 or to partially conceal the sensitive information (e.g., limiting visibility to all but the last four digits of the card number to help the cardholder identify the correct card before sending an authorization signal).

In block 420, the system may determine whether the authorization signal is authentic. As noted above, chip 310 may include one or more applications that enable chip 310 to compare information in the authorization signal with verified information, which may be stored locally on card 110 or via server 140 (e.g., at database 150), to confirm that the authorization signal is coming from an authorized device, such as cardholder device 120. Alternatively, card 110 may provide the authorization signal or a portion thereof to server 140 for server 140 to make the determination. In such embodiments that include step 420, and in one example, the authorization signal may include a private key that is stored on cardholder device 120 (or another authorized sending device) and can by compared, by card 110, to a private key stored on card 110. In another example, symmetric-key cryptography may be used such that set of cryptographic keys represent a shared secret between card 110 and cardholder device 120, with the cryptographic keys being used for both encryption of plaintext for at least a portion of the authorization signal and decryption of ciphertext. In yet another example, asymmetric cryptography may be used such that pairs of private and public keys are generated and a public key is used to encrypt at least a portion of the authorization signal while the recipient's private key along can decrypt the encrypted message. For any of these examples, the related keys may be generated (e.g., by card 110 or server 140) and communicated to cardholder device 120 during an earlier registration or authentication step that designates cardholder device 120 as being an authorized device to communicate with card 110.

If the authorization signal is determined to not be authentic, at block 430, the system may perform one or more anti-fraud actions such as sending an alert to the cardholder (e.g., to cardholder device 120), generating a fraud alert at server 140 for fraud monitoring purposes, disabling chip 310, and/or declining future attempted transactions from the card issuer (e.g., via server 140 or another device). For example, if the credit card is lost but has not yet been reported as lost, a non-authentic authorization signal may trigger the card alerting the card issuer (e.g., financial service provider) and/or cardholder device 120 to the non-authentic authorization signal. Card 110 may report such an alert to a POS device at a next transaction attempt or via cardholder device 120 next time card 110 is in communication with cardholder device 120. Disabling chip 310 may extend for a predetermined time threshold and/or until there is an override from the card issuer or cardholder device 120 to enable chip 310.

Conversely, if the authorization signal is determined to be authentic, at block 440, the system may determine an authorization signal type. As described above with respect to block 410, this determination may be based on cardholder input via cardholder device 120 and/or environmental data, and ultimately the authorization signal type may be used to determine which dynamic region(s) 320 and to what extent thereof to alter the visual properties (e.g., transparency/opaqueness, color, etc.) for.

Responsive to determining the authorization signal type, if applicable, at block 450 the system may direct certain or all dynamic region(s) 320 to transition from a first phase associated with current or default visual properties (e.g., opaque or a color that is difficult to see in view of the card's background color or environmental lighting based on environmental data in the authorization signal) to a second phase with different visual properties (e.g., transparent to the human eye or an alternative color that is easier to see in view of the card's background color and/or environmental lighting). For example, chip 310 may direct respective dynamic region arrays 370 to apply the appropriate level of voltage, light, and/or heat to the smart glass or other materials making up the corresponding dynamic region(s) 320. In some embodiments, block 450 may also include enabling chip 310 for purposes of conducting future transactions if it has been disabled or is defaulted to being disabled.

Next, at block 460, the system may direct certain or all of those dynamic region(s) 320 to transition back from the second phase to the first phase to again limit visibility of the sensitive information contained therein to the human eye. For example, chip 310 may direct respective dynamic region arrays 370 to stop applying the appropriate level of voltage, light, and/or heat to the smart glass or other materials making up the corresponding dynamic region(s) 320.

Optionally, at step 470, the transaction card (e.g., card 100 or transaction card 300) may disable chip 310 upon exceeding a predetermined time threshold in the second phase. For example, if the sensitive information is revealed and a merchant walks off with the card to complete a transaction but places the card down and 20 minutes goes by, the card may automatically disable chip 310 and/or take other fraud prevention step(s) as described herein to prevent fraudulent transactions.

By providing a transaction card or other physical card that contains sensitive information when needed but can selectively limit visibility of that information to the human eye when not needed, the sensitive information is better protected. This can be achieved by altering transparency/opaqueness levels or color of dynamic region(s) 320 to make sensitive information easier or more difficult to read as desired.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a markup language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

In the present description, numerous specific details are set forth. However, it is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Unless otherwise noted, the terms used herein are to be understood according to conventional usage by those of ordinary skill in the relevant art. In addition to any definitions of terms provided below, it is to be understood that as used in the specification and in the claims, "a" or "an" can mean one or more, depending upon the context in which it is used. Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Also, in describing example embodiments, certain terminology is used for the sake of clarity. It is intended that each term contemplates its broadest meaning as understood by those skilled in the art and includes all technical equivalents that operate in a similar manner to accomplish a similar purpose.

While certain embodiments of the disclosed technology have been described, it is to be understood that the disclosed technology is not to be limited to the disclosed example embodiments, but covers various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and to enable any person skilled in the art to practice the disclosed technology, including making and using any devices or systems and performing any incorporated methods. The patentable scope may include other examples that occur to those skilled in the art. Such other examples are intended to be within the scope of the claims if they have structural elements as the claims, or if they include equivalent structural elements with insubstantial differences from the literal language of the claims.

Example Use Cases

Figure 3D:
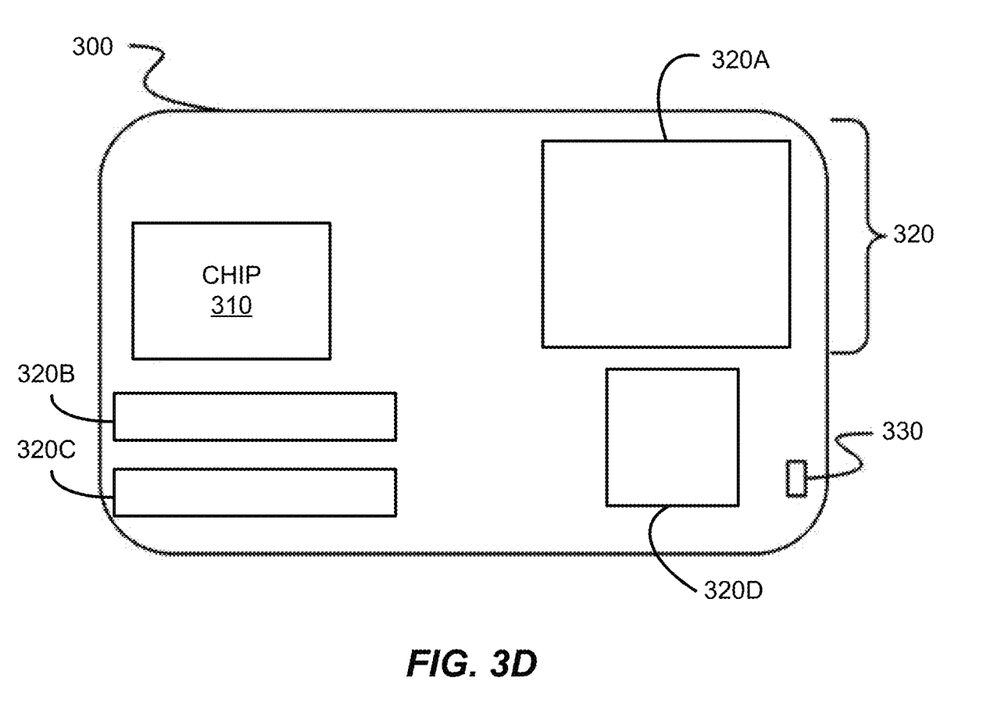

In certain example implementations, a cardholder Tom may have a transaction card, identification card, or other physical card with sensitive information that Tom wishes to not share with bystanders and potential fraudsters. For some transactions, such as a card-not-present transaction using Tom's computer at his home, Tom may need to access certain sensitive information such as full credit card number, expiration date, and card identifier (e.g., CVV code) and enter that information on a merchant's webpage. Thus, upon identifying a shirt that Tom wants to buy, he activates his banking app on his mobile device (e.g., cardholder device 120) and sends an authorization signal to his transaction card (e.g., transaction card 110). The information in the authorization signal is compared to stored verification information associated with Tom to, upon finding a match, authenticate the authorization signal. Tom indicates via the banking application that he wants to reveal all sensitive information because he is at home alone, and that authorization signal type is reflected in the authorization signal sent to his transaction card. Alternatively, the card may determine the authorization type based on environmental data, such as Tom's IP address, being connected to a home network associated with Tom, GPS information indicating that cardholder device 120 is positioned proximate Tom's home, etc., that is included as part of the authorization signal. Upon determining an authorization type associated with revealing all sensitive information, the card directs all of its dynamic regions to transition from a first phase that appears opaque to the human eye to prevent a human from reading sensitive information contained in each region (e.g., as shown in FIG. 3D) to a second phase that appears transparent to the human eye to allow a human to read the sensitive information in each region (e.g., as shown in FIG. 3A). In some examples, the cards dynamic regions may be more transparent (e.g., 100% versus 80%), and thus even easier to read, when the environmental data in the authorization signal indicates that Tom is in a non-public area (e.g., home) versus a public area (e.g., a restaurant). In this fashion, the sensitive information may still be readable to a person holding the card in a restaurant, but a bystander may have difficulty doing so. Tom proceeds to enter the information that he needs to complete the transaction via the merchant's website and, upon a further signal from Tom (via cardholder device 120) or exceeding a predetermined time threshold (e.g., five minutes), the card directs its dynamic regions to return back to the second, opaque phase to again limit the visibility of the sensitive information.

Later, Tom goes out to a restaurant with some friends and wants to pay for his meal. He removes his transaction card from his wallet, but is weary of sharing his name, credit card number, and other sensitive information with other patrons in the crowded restaurant. Tom and his friends each hand their transaction card to the server, who takes the cards to a merchant terminal to submit information for the related transactions. Tom wants some sensitive information to be revealed in case the server needs it and to help identify his card from his friends' cards when the server returns. As a result, Tom uses the banking application via cardholder device 120 to send an authorization signal to reveal only "lower risk" sensitive information as Tom had previously defined. The card, in turn, directs dynamic regions 320B and 320C to only show the last four digits of his card number and initial of his first name plus last name respectively. As previously mentioned, the first twelve digits of the card number may be shown at 80% transparency because the card is in a public place versus 100% transparency when the card is in a non-public place. The card also directs dynamic region 320A and 320D to remain opaque to conceal Tom's photograph on fingerprint on his card. The dynamic regions 320 remain in this second phase before returning to their default phases twenty minutes later and after the server has returned with Tom's card.

We claim:

1. A physical card comprising:
a substantially planar body bounded by a continuous peripheral edge, the body comprising one or more dynamic opacity regions having a material configured to appear opaque for human viewing in a first phase and translucent for human viewing in a second phase;
a computer readable chip;
a power source configured to power the one or more dynamic opacity regions;
a communication device;
one or more processors; and
a memory in communication with the one or more processors and storing instructions that, when executed by the one or more processors, are configured to cause the physical card to:
receive, via the communication device, an authorization signal from a recognized user device within a predetermined range of the physical card, the recognized user device being associated with a cardholder of the card,
wherein the authorization signal comprises environmental data associated with the recognized user device;
direct, via the one or more processors, at least one of the one or more dynamic opacity regions to transition from being opaque in the first phase to being translucent in the second phase responsive to receiving the authorization signal and based on the environmental data; and
direct, via the one or more processors, the at least one of the one or more dynamic opacity regions to transition from being translucent in the second phase to being opaque in the first phase upon hitting a predetermined time threshold in the second phase.

2. The physical card of claim 1, wherein the one or more dynamic opacity regions each contain first type information, with the first type information being concealed from human viewing when the material is in the first phase and human viewable when the material is in the second phase.

3. The physical card of claim 2, wherein the material extends to all of the first type information in the one or more dynamic opacity regions.

4. The physical card of claim 2, wherein the material extends to only a portion of the first type information in the one or more dynamic opacity regions.

5. The physical card of claim 1, wherein the instructions, when executed by the one or more processors, are further configured to cause the physical card to selectively authenticate the authorization signal based at least in part on information contained in the authorization signal, and directing the at least one of the one or more dynamic opacity regions to transition from being opaque in the first phase to being translucent in the second phase is responsive to authenticating the authorization signal.

6. The physical card of claim 5, wherein selectively authenticating the authorization signal further comprises comparing the information contained in the authorization signal with trusted device information stored locally in the memory.

7. The physical card of claim 1, wherein:
the instructions, when executed by the one or more processors, are further configured to cause the physical card to categorize the authorization signal into one of a plurality of authorization categories comprising a full authorization signal and a limited authorization signal; and
directing the at least one of the one or more dynamic opacity regions to transition from being opaque in the first phase to being translucent in the second phase comprises directing all of the one or more dynamic opacity regions to transition from being opaque in the first phase to being translucent in the second phase responsive to categorizing the authorization signal as the fully authorization signal and directing only a first portion of the one or more dynamic opacity regions to transition from being opaque in the first phase to being translucent in the second phase responsive to categorizing the authorization signal as the limited authorization signal.

8. The physical card of claim 7, wherein the first portion of the one or more dynamic opacity regions covers only a final four digit sequence of a card number such that only a portion of the card number is human readable responsive to categorizing the authorization signal as the limited authorization signal.

9. The physical card of claim 1, wherein the instructions, when executed by the one or more processors, are further configured to cause the physical card to disable the computer readable chip upon hitting the predetermined time threshold in the second phase.

10. The physical card of claim 2, wherein the first type information is associated with the physical card and comprises a card number, name, expiration date, and a card identifier.

11. The physical card of claim 1, wherein the environmental data comprises a Global Positioning System (GPS) location of the recognized user device.

12. The physical card of claim 1, wherein the authorization signal is triggered through a mobile application.

13. The physical card of claim 12, wherein the mobile application is configured to receive, from the cardholder, a desired level of revealing sensitive information on the physical card.

14. A method for selectively revealing first type information on a surface of a physical card, the method comprising:
receiving, via a communication device of the physical card having a body comprising one or more dynamic opacity regions having a material configured to appear opaque for human viewing in a first phase and translucent for human viewing in a second phase, an authorization signal from a recognized user device within a predetermined range of the physical card, the recognized user device being associated with a user of the physical card, and wherein the authorization signal comprises environmental data associated with the recognized user device;
directing, via one or more processors of the physical card, at least one of the one or more dynamic opacity regions to transition from being opaque in the first phase to being translucent in the second phase responsive to receiving the authorization signal and based on the environmental data; and
directing, via the one or more processors, the at least one of the one or more dynamic opacity regions to transition from being translucent in the second phase to being opaque in the first phase upon exceeding a predetermined time threshold in the second phase.

15. The method of claim 14, wherein the one or more dynamic opacity regions each contain first type information, with the first type information being concealed from human viewing when the material is in the first phase and human viewable when the material is in the second phase.

16. The method of claim 14, wherein directing at least one of the one or more dynamic opacity regions to transition from being opaque in the first phase to being translucent in the second phase further comprises identifying an authorization type associated with the authorization signal, identifying one or more selected dynamic opacity regions of the one or more dynamic opacity regions based on the authorization type, and directing only the one or more selected dynamic opacity regions to transition from being opaque in the first phase to being translucent in the second phase.

17. The method of claim 14, further comprising directing, via the one or more processors, a computer readable chip of the physical card to become disabled for purposes of conducting new transactions upon exceeding a predetermined time threshold in the second phase.

18. The method of claim 14, wherein the first type information is associated with the physical card and comprises a card number, name, expiration date, and a card identifier.

19. A physical card comprising:
- a body comprising a plurality of dynamic textual characters in a material configured to appear in a first color for human viewing in a first phase and in a second color for human viewing in a second phase to selectively reveal first type information represented by sequences of the dynamic textual characters;
- one or more processors; and
- a memory in communication with the one or more processors and storing instructions that, when executed by the one or more processors, are configured to cause the physical card to:
  - receive an authorization signal from a trusted user device associated with an authorized user of the physical card, wherein the authorization signal comprises environmental data associated with the trusted user device;
  - direct at least one selected character of the plurality of dynamic textual characters to transition from appearing in a first color in the first phase to appearing in the second color in the second phase responsive to receiving the authorization signal and based on the environmental data; and
  - direct the at least one selected character to transition from appearing in the second color in the second phase to appearing in the first color in the first phase upon exceeding a predetermined time threshold in the second phase.

20. The physical card of claim 19, wherein:
the first color matches a surrounding background color of the body; and
the second color differs from the first color.

21. The physical card of claim 20 further comprising a power source configured to provide power to the plurality of dynamic textual characters.

22. The physical card of claim 20, wherein:
the plurality of dynamic textual characters comprise embossed textual characters;
the material covers one or more exposed front surfaces of the embossed textual characters side surfaces; and
one or more exposed side surfaces of the embossed textual characters have the surrounding background color of the body.

23. The physical card of claim 19, further comprising a computer readable chip for conducting new transactions, wherein:
the first type information comprises a card number, name, expiration date, and a card identifier;
the computer readable chip is configured to receive power from an external power source for purposes of providing power to the plurality of dynamic textual characters; and
the instructions, when executed by the one or more processors, are further configured to cause the physical card to disable the computer readable chip upon exceeding the predetermined time threshold in the second phase.

\* \* \* \* \*